US006940624B1

(12) United States Patent
Sardesai

(10) Patent No.: US 6,940,624 B1
(45) Date of Patent: Sep. 6, 2005

(54) WAVELENGTH DIVISION MULTIPLEXED OPTICAL COMMUNICATION SYSTEM HAVING REDUCED NON-LINEAR EFFECTS

(75) Inventor: Harshad P. Sardesai, Elkridge, MD (US)

(73) Assignee: CIENA Corporation, Linthicum, MD (US)

( * ) Notice: Subject to any disclaimer, the term of this patent is extended or adjusted under 35 U.S.C. 154(b) by 0 days.

(21) Appl. No.: 09/197,943

(22) Filed: Nov. 23, 1998

(51) Int. Cl.[7] .............................. H04J 4/00; H04J 14/02; H04B 10/00; H04B 10/12
(52) U.S. Cl. ....................... 359/124; 359/123; 359/115; 359/161; 359/173
(58) Field of Search ................................. 359/124, 123, 359/115, 161, 173

(56) References Cited

U.S. PATENT DOCUMENTS

| 4,775,972 A | * | 10/1988 | Ih et al. ......................... 370/3 |
| 5,013,116 A | | 5/1991 | Yamazaki et al. ........ 350/96.15 |
| 5,504,609 A | | 4/1996 | Alexander et al. .......... 359/125 |
| 5,546,210 A | * | 8/1996 | Chraplyvy et al. .......... 359/124 |
| 5,589,969 A | | 12/1996 | Taga et al. ................... 359/124 |
| 5,696,615 A | | 12/1997 | Alexander .................... 359/134 |
| 6,104,514 A | * | 8/2000 | Fee et al. ..................... 359/161 |
| 6,118,563 A | * | 9/2000 | Boskovic et al. ............. 359/124 |

OTHER PUBLICATIONS

Boskovic et al., "FWM Penalty Reduction in Dense WDM Systems through Channel Detuning", ECOC'98, vol. 1, pp. 163–164, 1998.*

PCT, International Preliminary Examination Report, pp. 1–6, Mar. 8, 2001.

Boskovic, A., et al., "FWM Penalty Reduction in Dense WDM Systems through Channel Detuning", ECOC '98, vol. 1, pp. 163–164, (1998).

Jae–Seung Lee, et al., "Periodic allocation of a set of unequally spaced channels for upgradable dense–WDM applicantions using dispersion–shifted fibers", OFC '98 Technical Digest, vol. 2, pp. 393–394 (1998).

Lee, J–S, et al., "Periodic Allocation of a St of Unequally Spaced Channels for WDM Systems Adopting Dispersion- -Shifted Fibers", IEEE Photonics Technology Letters, vol. 10, No. 6, pp. 825–827, (1998).

Sang–Soo Lee, et al., "Enhancement of power margin and scalability in WDM links adopting dispersion–shifted fibres using periodic–unequally–spaced–channel allocation", Electronics Letters, vol. 35, No. 14, pp. 1176–1177, (1999).

ITU–TRecommendation G.692, "Optical Interfaces for Multichannel Systems with Optical Amplifiers", pp. 1–33, (1998).

* cited by examiner

Primary Examiner—Leslie Pascal
Assistant Examiner—M. R. Sedighian
(74) Attorney, Agent, or Firm—David L. Soltz

(57) ABSTRACT

In a wavelength division multiplexed system, optical frequencies are assigned in accordance with a channel plan conforming to an International Telecommunications Union (ITU) grid whereby every third channel position in the grid is vacant. As a result, both four wave mixing (FWM) and cross phase modulation (XPM) are reduced using ITU standard frequencies. In addition, a low bandwidth expansion factor (BEF) can be achieved.

6 Claims, 7 Drawing Sheets

WAVELENGTH DIVISION MULTIPLEXED OPTICAL COMMUNICATION SYSTEM HAVING REDUCED NON-LINEAR EFFECTS

BACKGROUND OF THE INVENTION

The present invention is directed toward an optical communication system having reduced four-wave-mixing (FWM) and cross-phase modulation (XPM).

Optical signals transmitted in a fiber optic communication system typically constitute a series of pulses of digital information with a "1" bit represented by the presence of light at a relatively high intensity, and a "0" corresponding to a substantial reduction in optical intensity. In early fiber optic communication systems, the pulses of light were transmitted at a single wavelength. More recently, however, wavelength division multiplexing (WDM) has been explored as an approach for increasing the capacity of existing fiber optic networks. In a WDM system, plural optical signal channels are carried over a single transmission optical fiber with each channel being assigned a particular wavelength. The optical channels typically lie within narrow range about 1550 nm, the low loss band associated with silica based optical fibers. WDM systems further include a plurality of receivers, each detecting a respective channel by effectively filtering out the remaining channels.

In order to further increase capacity, high data rate time division multiplexed systems are also being developed. Such systems can be implemented with WDM equipment to provide WDM systems with enhanced capacity. For example, WDM systems carrying 16 channels, each of which being modulated at rates of 10 Gbit/s, are being developed which have a total capacity of 160 Gbit/s. At such high data rates, the optical pulses corresponding to the transmitted data are narrowed significantly. Accordingly, the optical power associated with each pulse is also increased in order to assure adequate detection of the transmitted signals. With increased power, nonlinear effects which are directly proportional to the peak power become more important. Conventional WDM systems transmit signals on non-dispersion shifted fibers (NDSF) which are quite insensitive towards non-linear effects. More recent WDM systems use non-zero dispersion shifted fibers (NZDSF) and dispersion shifted fibers (DSF) which by design have low dispersion. Examples of NZDSF fibers are Corning LS®, Corning LEAF®, and Lucent TW®. These transmission fibers are primarily used to reduce the dispersion compensation requirements of the entire system. However, the low fiber dispersion makes them sensitive to nonlinear effects in particular FWM and XPM (explained below) causing errors in transmission. Note that nonlinear effects will also become important in NDSF systems when the power per channel is increased as would be required by systems having high span losses or long propagation distances or when the channel spacing is decreased.

One type of nonlinearity, known as cross phase modulation (XPM), is caused by the optical intensity of one signal modulating the phase of another optical signal due to intensity dependent refractive index variations of the fiber. The phase modulation can impose a frequency chirp that redistributes the signal frequency spectrum such that lower frequencies are shifted toward the leading edge of an optical signal pulse and higher frequencies are shifted toward the trailing edge. These changes in frequency distribution coupled with the chromatic dispersion of transmission fiber can cause intensity modulation and degrade the transmitted optical signals. For a fixed amount of power per channel, XPM is inversely proportional to the frequency separation between channels, the dispersion of the transmission fiber (i.e., the "local dispersion"), and the number of channels present.

Most WDM systems having transmission distances greater than a few hundred kilometers require some form of dispersion compensation to offset the chromatic dispersion of the transmission fiber in which various spectral components of an optical signal pulse propagate through the fiber at different speeds and distort the pulse shape. The dispersion compensating devices, one of which can be a segment of dispersion compensating fiber (DCF), can be placed at appropriate points in a WDM link between the transmitter and receiver. In addition, the magnitude of dispersion compensation is known to significantly effect, by either decreasing or increasing, the level of XPM experienced by a particular channel in the system (see, for example, T. K. Chiang, N. Nobuyuki, M. E. Marhic, and L. G. Kazovsky, "Cross-Phase Modulation in Fiber Links with Multiple Optical Amplifiers and Dispersion Compensator," Journal of Lightwave Technology, vol. 14, pp. 249–259, 1996).

Although, in theory, dispersion compensation can be used to partly offset XPM and the resultant intensity modulation, in practice, several problems can be encountered. First, to reach an optimal dispersion compensation which significantly reduces the effects of XPM, the dispersion compensating element should have predetermined precise values depending on parameters unique to each system. Most commercially available dispersion compensating devices, e.g., DCF, do not have one unique dispersion value, but are warrantied to have dispersion values within a nominal range.

Second, the chromatic dispersion of the transmission fiber is not precisely known, but is merely specified to be within a particular range of values, as well, and the variation of its dispersion value may be more or less than that of the dispersion compensating element. Accordingly, in light of the above, commercially available dispersion compensating elements cannot be used to offset the effect of XPM unless time consuming dispersion measurements are undertaken during installation.

Moreover, in addition to uncertainties in the precise knowledge of the amount of dispersion as discussed above, WDM systems may contain other dispersion elements like in-fiber Bragg gratings and interference filters which may also have an inherent amount of dispersion that varies due to design or manufacturing limitations. Such elements are typically used for channel selection in a multichannel systems, and any variation in their dispersion may cause the predetermined optimal dispersion (i.e., the "dispersion map") of certain channels to change so that a sub-optimal amount of XPM reduction is achieved.

In addition to XPM, intensity dependent fiber refractive index variations can cause co-propogating optical signals at different wavelengths to interact to produce additional optical frequencies through four wave mixing (FWM). In particular, for two channels at frequencies fi and fj (fj>fi) such that fj−fi=Δf is the frequency separation, the process of FWM adds new optical frequencies or "mixing products" in the spectrum at frequencies fi−Δf and fj+Δf. In a multichannel system, if all channels are equally spaced by Δf, the mixing products can fall on the same spectral locations as the channels neighboring fi and fj, contributing as noise to those neighboring channels and degrading their performance. The magnitude and efficiencies of FWM for a fixed amount of power per channel is also inversely proportional to the frequency separation of the channels, the local dispersion of transmission fiber, and the number of channels present.

In order to reduce non-linear effects, such as FWM, optical frequencies are assigned unique values in accordance with a channel plan. Channel plans have been proposed whereby the channels are equally spaced, but relatively far apart from one another in order to minimize these nonlinearities. Such equally spaced channel plans require a significant spectral range or bandwidth which can exceed the low loss transmission band for silica based optical fibers. Equally spaced channel plans having large channel separations are thus usually unsuitable for high channel count WDM systems.

An alternative channel plan including non-uniform or unequal channel spacings is described, for example, in U.S. Pat. No. 5,546,210. This scheme, however, typically also requires a relatively large bandwidth to accommodate each of the channels, although not as much as the equally spaced channel plans described above. The amount of bandwidth required is quantified with a parameter referred to as a bandwidth expansion factor (BEF), which is defined as the bandwidth ratio between an unequally spaced channel plan and an equally spaced channel plan for a given number of channel. An exemplary BEF of 1.8 is described in the above patent, but a lower BEF is desirable.

Moreover, the International Telecommunications Union (ITU) has standardized a frequency "grid", which WDM systems are expected to conform to. The grid consists of equally spaced frequency designations 50 GHz apart. Most unequally spaced channel schemes require non-standard frequencies or channels that do not conform to the ITU grid, and may have limited commercial acceptance.

SUMMARY OF THE INVENTION

Consistent with the present invention, an optical communication system is provided which comprises a plurality of transmitters, each of which emitting a respective one of a plurality of optical signals. Each of the plurality of optical signals is at a corresponding one of a plurality of optical frequencies, and each of the plurality of optical frequencies has an associated first adjacent optical frequency and an associated second adjacent optical frequency. Both the associated first and second optical frequencies are among the plurality of optical frequencies, and each of the plurality of optical frequencies being spaced from the associated first adjacent optical frequency by a first range of frequencies and spaced from the associated second optical frequency by a second range of optical frequencies. A magnitude of the first range is twice a magnitude of the second range.

The optical communication system further comprises an optical communication path coupled to the plurality of transmitters and carries the plurality of optical signals. In addition, a plurality of optical receivers, each of which being coupled to said optical communication path and sensing a respective one of said plurality of optical signals.

In accordance with a further aspect of the present invention, an optical device is provided comprising a plurality of transmitters, each of which emitting a respective one of a plurality of optical signals. Each of the plurality of optical signals being at a corresponding one of a plurality of frequencies. A number of the plurality of frequencies being at least equal to ten, and the plurality of frequencies conforming to a channel plan, which has a bandwidth expansion factor less than or equal to 1.5.

The optical device further comprises an optical combiner coupled to the plurality of transmitters. The optical combiner is configured to direct each of the plurality of optical signals to an optical communication path.

BRIEF DESCRIPTION OF THE DRAWINGS

Advantages of the present invention will be apparent from the following detailed description of the presently preferred embodiments thereof, which description should be considered in conjunction with the accompanying drawings in which:

FIG. 3b illustrates an eye diagram corresponding to one of the plots shown in FIG. 3a;

FIG. 4b illustrates an eye diagram corresponding to one of the plots shown in FIG. 4a.

DETAILED DESCRIPTION

In a WDM system, optical frequencies are assigned in accordance with a channel plan conforming to an ITU grid whereby every third channel position in the grid is vacant. As a result, both FWM and XPM are reduced using ITU standard frequencies within a range of 190.0 THz to 197.0 THz. In addition, a low bandwidth expansion factor (BEF) can be achieved.

Figure 1:
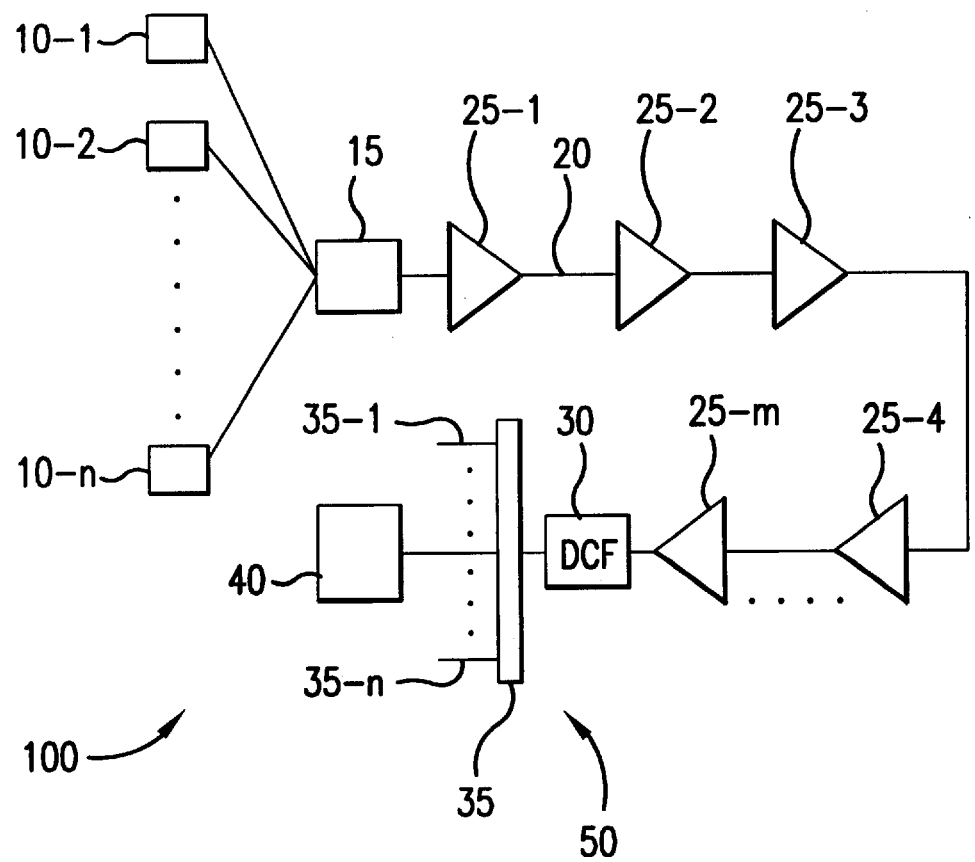
Fig. 1 illustrates a WDM optical communication system.

Turning to the drawings in which like reference characters indicate the same or similar elements in each of the several views, FIG. 1 illustrates an optical communication system 100 consistent with the present invention. Optical communication system 100 includes a plurality of optical transmitters 10-1 to 10-n, each of which including a directly or externally modulated laser emitting light at a respective one of a plurality of frequencies, and at data rates of 10 Gbit/sec. Optical transmitters 10-1 to 10-n are further described, for example, in U.S. Pat. No. 5,696,615 and 5,504,609, incorporated by reference herein. Optical signals emitted by transmitters 10-1 to 10-2 are fed to an optical combiner 15, which supplies the optical signals to an optical communication path 20, such as an optical fiber. If necessary, a plurality of optical amplifiers 25-1 to 25-m, such as erbium doped fiber amplifiers (EDFAs), can be provided along optical communication path 20 to appropriately amplify the optical signals and offset any attenuation thereof. In addition, a segment of DCF 30 is optionally provided near the receive end of optical communication path 20 in order to effectively cancel accumulated dispersion of optical signals propagating along optical communication path 20.

The optical signals are next supplied to an optical demultiplexer 50, including an optical splitter 35 which outputs all the optical signals at each output port 35-1 to 35-n. Receiving elements are connected to corresponding one of output ports 35-1 to 35-n, to sense a respective one of the transmitted optical signals. One such receiving element, element 40, is shown in FIG. 1, and is further described in U.S. Pat. No. 5,696,615 supra.

Figure 2:
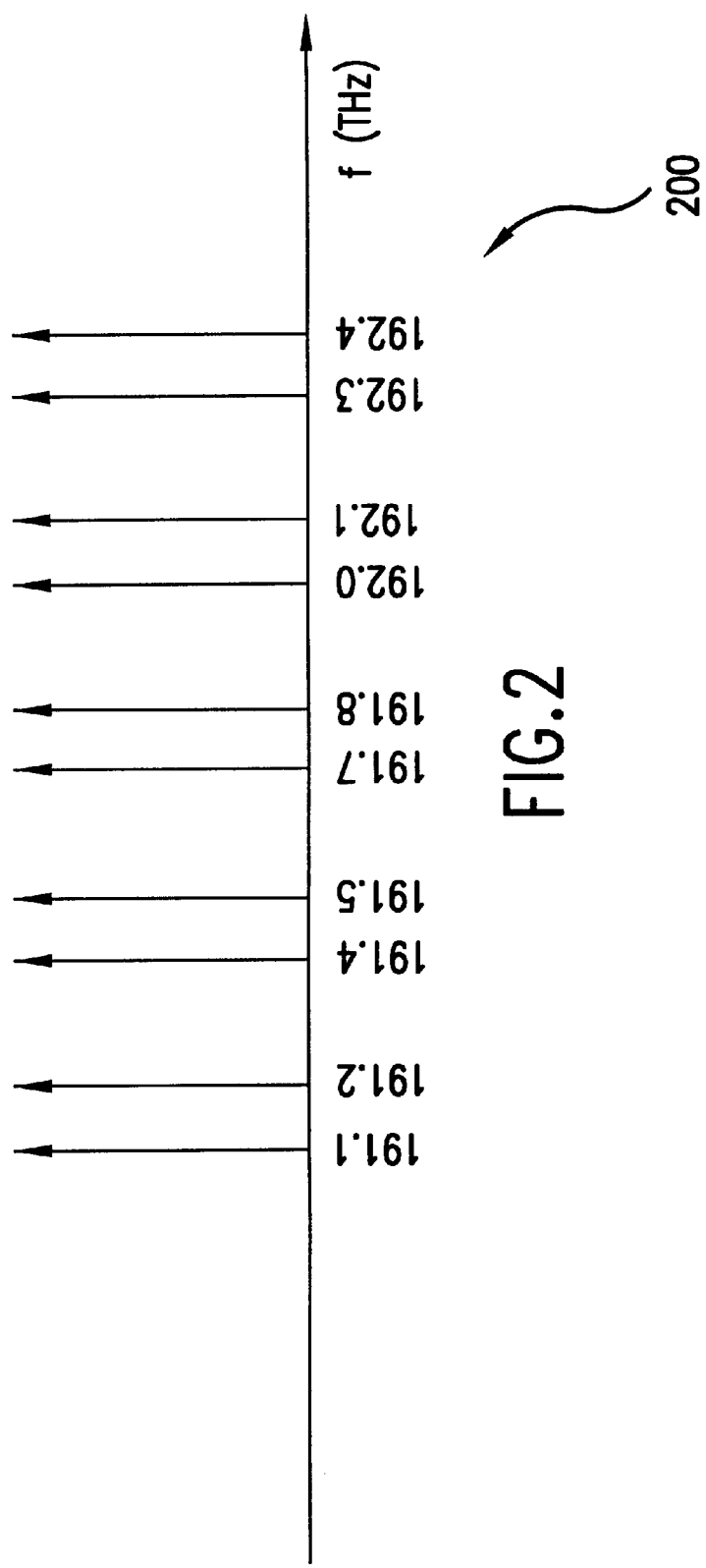
FIG. 2 illustrates a channel plan in accordance with the present invention.

Typically, optical transmitters emit the optical signals in accordance with channel plan 200 shown in FIG. 2. Each arrow in channel plan 200 represents an optical signal at a particular frequency or frequency location within the channel plan. The frequencies identified in channel plan 200 conform to an ITU grid. However, every third frequency location within the grid is not used. Accordingly, the spectral distance between each channel and a first adjacent channel is twice the distance to a second adjacent channel. For example, as shown in FIG. 2, selected optical transmitters shown in FIG. 1 can be configured to emit optical signals at 191.1 THz, 191.2 THz, 191.4 THz. In which case, the spectral distance between the 191.2 THz and a first adjacent channel (the 191.4 THz signal) is twice the spectral distance to the second adjacent channel (the 191.1 THz signal). Likewise, the 191.4 THz signal is spaced from the 191.2 THz signal by twice the spectral distance to the 191.5 THz signal.

As a result, FWM is reduced because mixing products fall between frequencies 191.2 THz and 191.4 THz, for example, where there are no channels. Moreover, the relatively wide frequency spacing between the 191.2 THz signal and the 191.4 THz signal reduces the XPM that would otherwise degrade these two signals if the frequencies associated therewith were spaced closer together. In a similar fashion, remaining channels within channel plan 200 also have reduced FWM and XPM. It is noted, however, that reductions of FWM and XPM can also be achieved in accordance with the present invention with DCF 30 shown in FIG. 1.

Figure 3A:
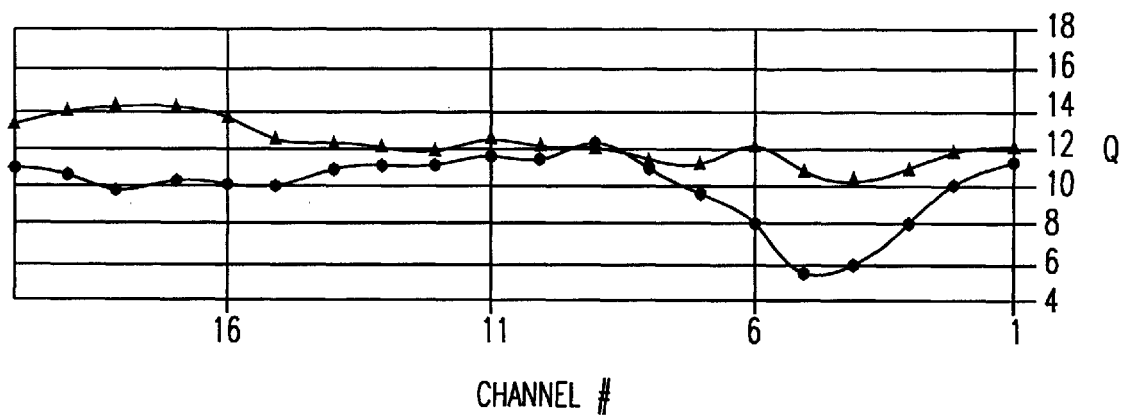
FIG. 3a illustrates plots of channel count vs. Q for conventional WDM systems having different levels of dispersion compensation.

Further advantages of the present invention will next be described with reference to FIGS. 3a, 3b, 4a, and 4b. FIG. 3a illustrates "Q" values, as a function of channel frequency for the WDM system shown in FIG. 1 carrying 20 equally spaced channels in which channel 1 is at 192.4 THz and channel 20 is 194.3 THz. This particular system consisted of 4 spans of 75 kms of Lucent TW®fiber (local dispersion =2.9ps/nm/km), with each span having a span loss of 25 dB. Note that the Q factor is proportional to the signal to noise ratio at the decision circuit of the receiver and is calculated by measuring the bit error ratio (BER) of the WDM system in accordance a technique described in N. S. Bergano, F. W. Kerfoot, and C. R. Davidson, "Margin Measurement in Optical Amplifier Systems," IEEE Photon Technology Letters, vol. 5, pp. 304–306, 1993. Data points in FIG. 3a marked by triangles correspond to measured Q values in which DCF 30 in FIG. 1 provides compensation of −400 ps/nm, while the "circle" data points correspond to measured Q values when the compensation equals −600 ps/nm.

Figure 3B:
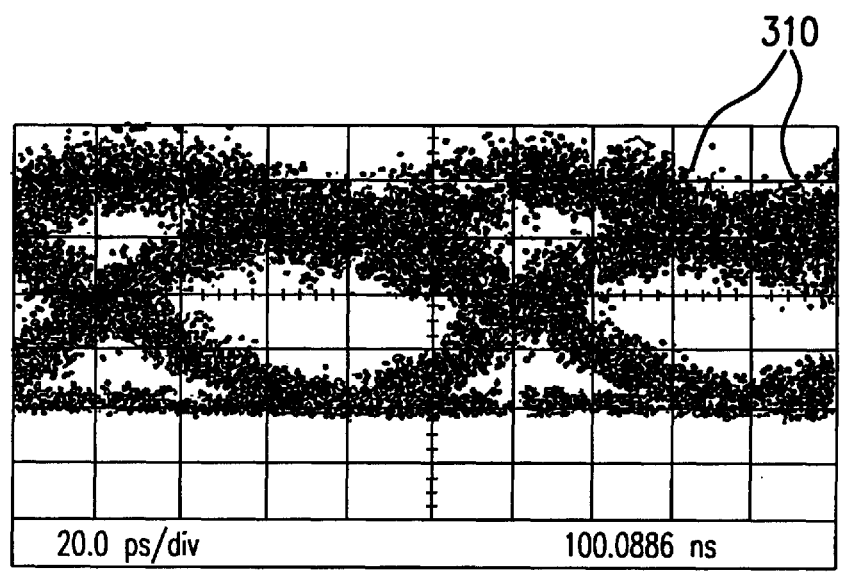

As further seen in FIG. 3a, with a compensation of −400 ps/nm, acceptable Q values greater than 10 can be obtained. However, in practice, DCF manufacturers cannot specify compensation values to a particular amount, and any variation in the amount of compensation can adversely impact Q. For example, with a compensation value of −600 ps/nm, the same system has Q values less than 10 for channels 3 through 7 due, at least in part, to FWM and XPM. An "eye-diagram" for the system shown in FIG. 1 with equally spaced channels and −600 ps/nm compensation is shown in FIG. 3b. The low Q value is due to higher noise, which is observed in the eye-diagram as smeared portion 310 in FIG. 3b.

Figure 4A:
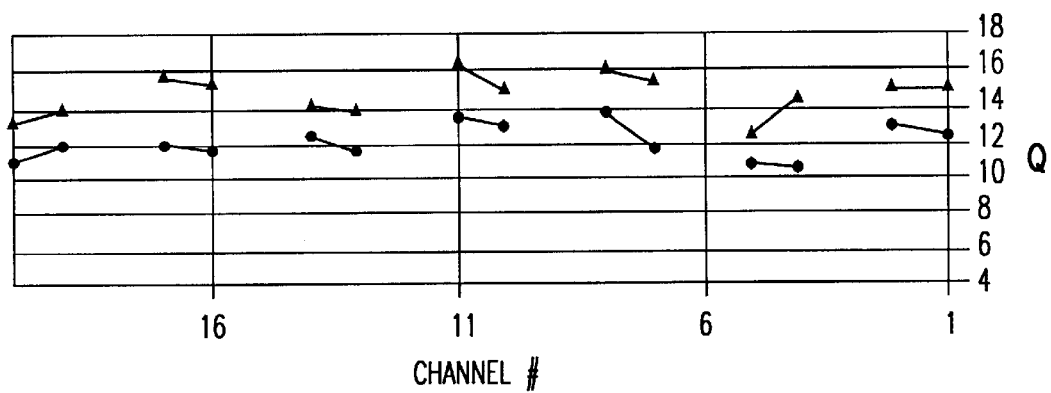
FIG. 4a illustrates plots of channel count vs. Q for a WDM system in accordance with the present invention having different levels of dispersion compensation.
Figure 4B:
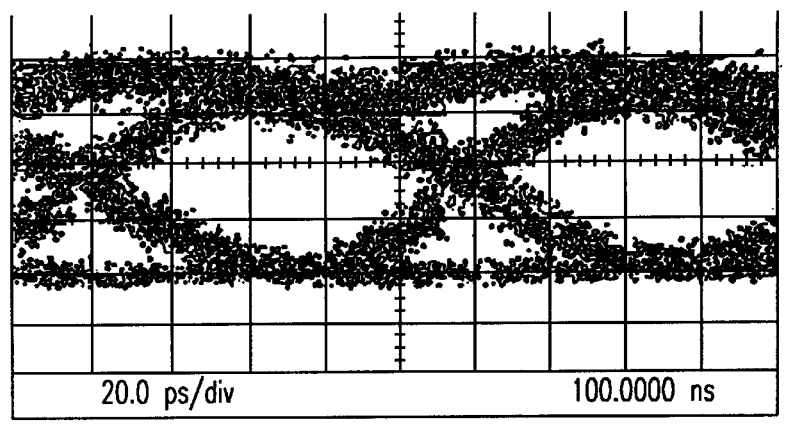

Thus, conventional WDM systems having equally spaced channels can achieve adequate Q values with an appropriate amount of dispersion compensation, but if the precise amount of compensation is not present, as is frequently the case, Q is affected significantly. In FIG. 4a, on the other hand, WDM system 100 shown in FIG. 1 conforms to an unequally spaced channel plan similar to that shown in FIG. 2. Here, Q values are consistently above 10 for all channels and for both −400 ps/nm and −600 ps/nm compensation values. Thus, WDM system 100 with unequally spaced channels in accordance with the present invention has a higher degree of tolerance to variations in dispersion compensation, and high Q values can be obtained over a relatively wide range of dispersion compensation values. FIG. 4b illustrates an eye diagram corresponding to the system having the Q values shown in FIG. 4a. Lower noise is obtained as evidenced by the cleaner more open eye diagram shown in FIG. 4b relative to the eye diagram shown in FIG. 3b.

Since every third frequency location of the ITU grid is not used, the total spectral width required by the channel plan in accordance with the present invention is at most 1.5 times the bandwidth of a corresponding equally spaced system. Thus, a BEF at most equal to 1.5 is achievable with the present invention regardless of the number of channels present. By way of comparison, BEF values obtained by a WDM system described in U.S. Pat. No. 5,564,210 supra. are generally greater than the BEF obtained with the present invention, as seen in TABLE 1 below.

| N (number of channels) | BEF of conventional unequally spaced WDM system |
|---|---|
| 5 | 1.3 |
| 10 | 1.8 |
| 15 | 2.3 |
| 20 | 2.8 |
| 25 | 3.5 |
| 30 | 3.8 |
| 35 | 4.3 |
| 40 | 4.8 |

The BEF values shown in Table 1 are calculated based on Equation 4 of U.S. Pat. No. 5,546,210 and assuming a minimum separation parameter n equal to 5, where n is the ratio of minimum channel spacing to minimum distance of any FWM product to any channel. According to U.S. Pat. No. 5,546,210, n >5 for most WDM systems.

As can be seen in Table 1, conventional WDM systems noted above have BEF values equal to 1.8 for 10 channel systems and as great as 4.8 for 40 channel systems. Accordingly, such conventional unequally channel spaced systems consume more bandwidth than that required by the present invention, and thus typically carry fewer channels.

Moreover, the unequally spaced channel systems discussed above frequently include non-standard channels that do not conform to the ITU grid. In accordance with the present invention, however, optical signals are assigned frequencies that conform to ITU grid, thereby improving commercial acceptance.

Figure 5:
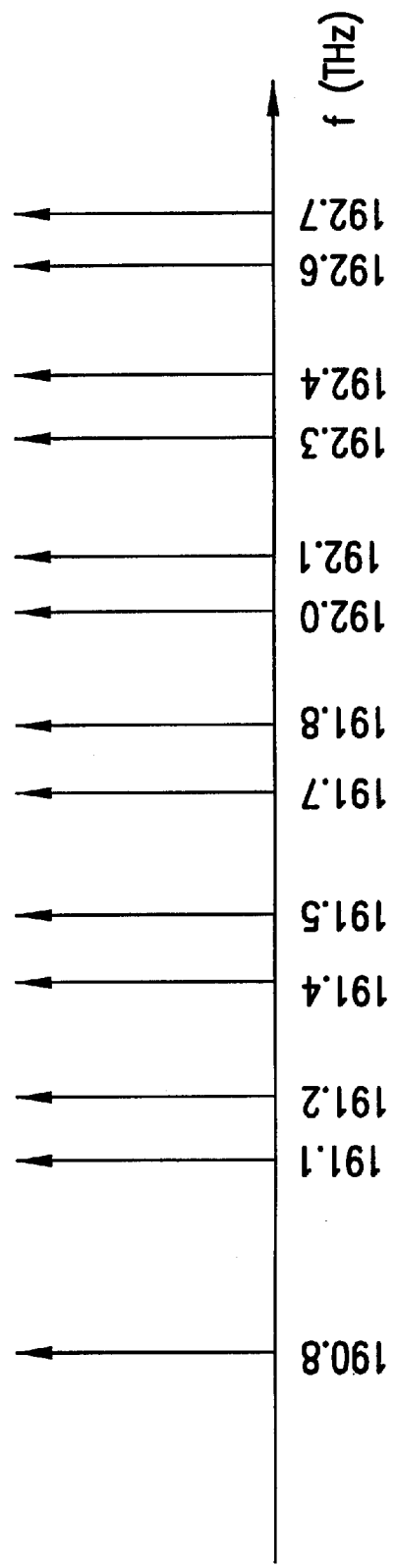
FIGS. 5, 6 and 7 illustrate channel plans in accordance with a further aspect of the present invention.
Figure 6:
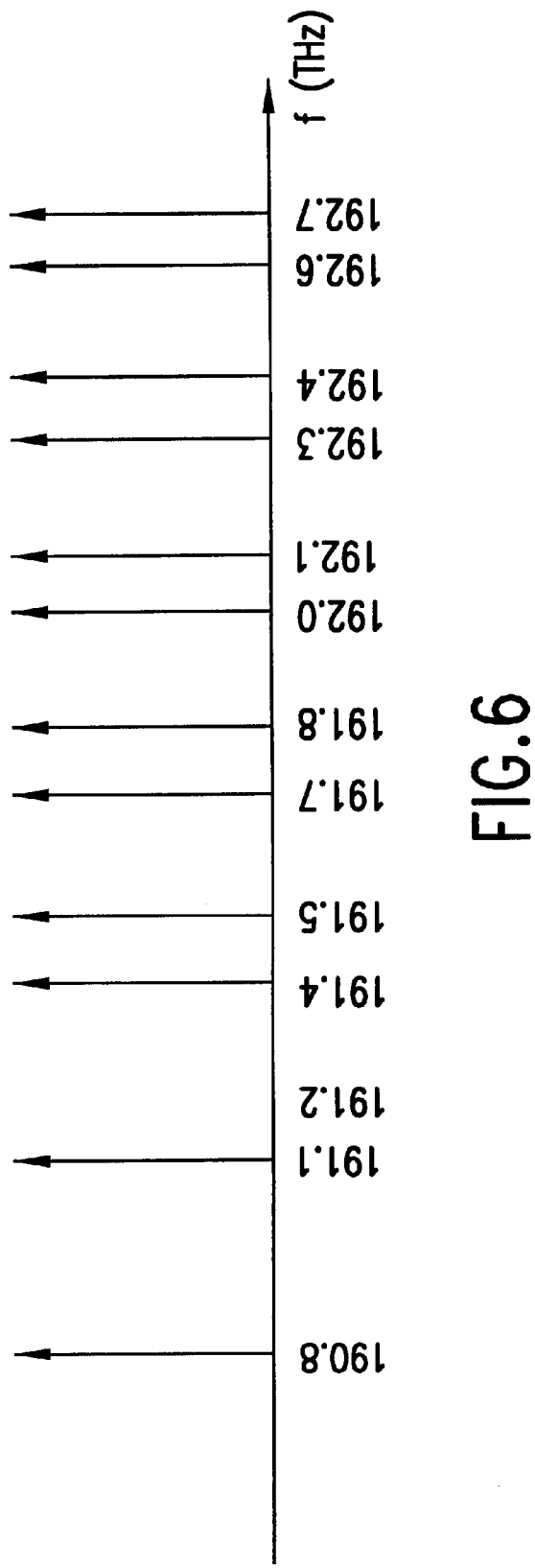
Figure 7:
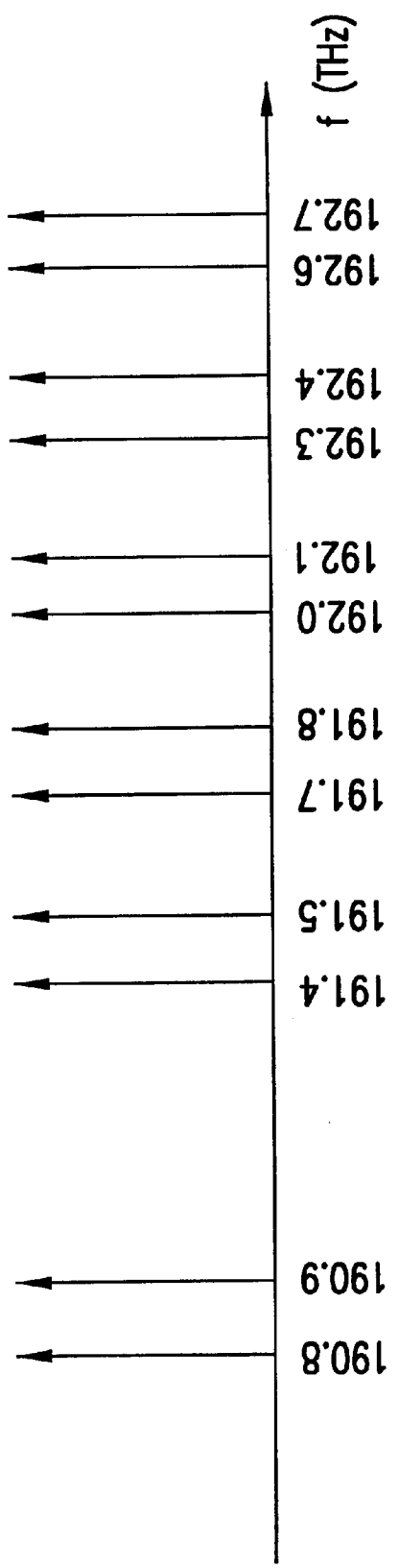

Other channel plans are also considered within the scope of the present invention. For example, FIGS. 5, 6 and 7 illustrate channel plans which are less periodic than the scheme described above with reference to FIG. 2. WDM systems having these channel plans also have a reduced BEF, as well as XPM and FWM. Such systems typically include at least 10 channels and have a BEF not more than 1.7. For example, the channel plan shown in FIG. 5 has thirteen channels and a BEF of 1.54, FIG. 6 has twelve channels and a BEF of 1.67, and FIG. 7 has twelve channels and a BEF of 1.67.

While the foregoing invention has been described in terms of the embodiments discussed above, numerous variations are possible. Accordingly, modifications and changes such as those suggested above, but not limited thereto, are considered to be within the scope of the following claims.

What is claimed is:

1. An optical communication system, comprising:

a plurality of optical transmitters, each of said plurality of optical transmitters emitting a respective one of a plurality of optical signals, each of said plurality of optical signals being at a corresponding one of a plurality of optical frequencies, each of a group of said plurality of optical frequencies having an associated first adjacent optical frequency and an associated second adjacent optical frequency, both said associated first and second optical frequencies being among said plurality of optical frequencies, said each of said group of said plurality of optical frequencies being spaced from said associated first adjacent optical frequency by a first frequency spacing and spaced from said associated second optical frequency by a second frequency spacing, a magnitude of said first frequency spacing being twice a magnitude of said second frequency spacing, a number of said optical frequencies in said group being at least equal to 10, said plurality of optical frequencies conform to a channel plan, said channel plan having a bandwidth expansion factor less than or equal to 1.7;

an optical communication path coupled to said plurality of transmitters and carrying said plurality of optical signals; and a plurality of optical receivers, each coupled to said optical communication path and sensing a respective one of said plurality of optical signal.

2. An optical device, comprising:

a plurality of transmitters, each of said plurality of optical transmitters emitting a respective one of a plurality of optical signals, each of said plurality of optical signals being at a corresponding one of a plurality of optical frequencies, each of a group of said plurality of optical frequencies having an associated first adjacent optical frequency and an associated second adjacent optical frequency, both said associated first and second optical frequencies being among said plurality of optical frequencies, said each of said group of said plurality of optical frequencies being spaced from said associated first adjacent optical frequency by a first frequency spacing and spaced from said associated second optical frequency by a second frequency spacing, a magnitude of said first frequency spacing being twice a magnitude of said second frequency spacing, a number of said optical frequencies in said group being at least equal to 10, said plurality of optical frequencies conform to a channel plan, said channel plan having a bandwidth expansion factor less than or equal to 1.7; and an optical combiner coupled to said plurality of transmitters, said optical combiner being configured to direct each of said plurality of optical signals to an optical communication path.

3. An optical device, comprising:

a plurality of transmitters, each of said plurality of transmitters emitting a respective one of a plurality of optical signals, each of which being at a corresponding one of a plurality of frequencies, said plurality of frequencies conforming to a channel plan, said channel plan having a bandwidth expansion factor less than or equal to 1.7, and a number of said plurality of frequencies being at least equal to 10; and an optical combiner coupled to said plurality of transmitters, said optical combiner being configured to direct each of said plurality of optical signals to an optical communication path.

4. An optical device in accordance with claim 3, wherein each of said plurality of optical signals is modulated at a rate exceeding 10 Gb/s.

5. An optical device in accordance with claim 3, wherein said plurality of optical frequencies lie within a range of 190.0 THz to 197.0 THz.

6. An optical communication system in accordance with claim 3, wherein said plurality of optical signals further conform to an International Telecommunications Union grid.

* * * * *